UNITED STATES PATENT OFFICE.

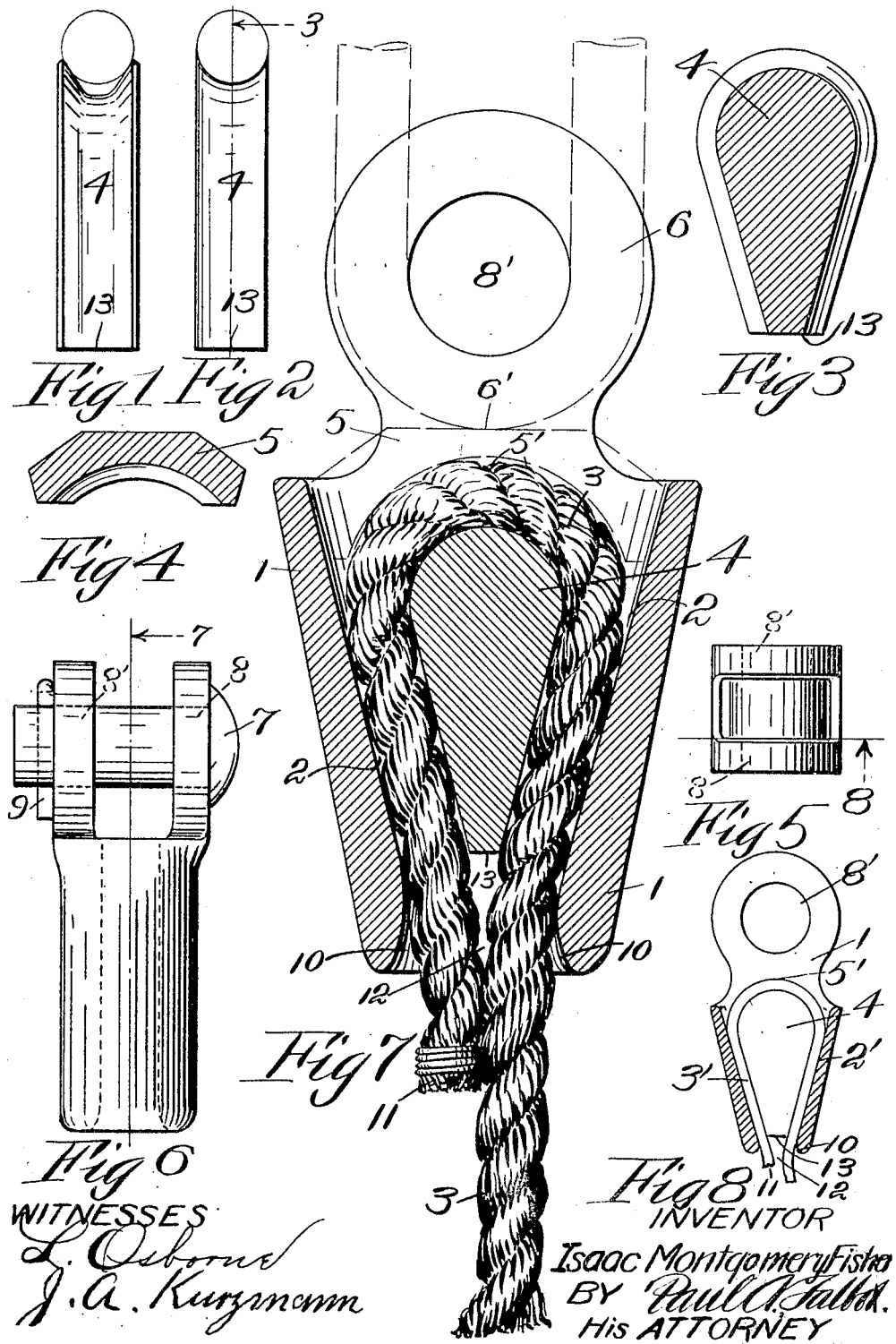
I. M. FISHER.
ROPE OR STRAP FASTENING DEVICE.
APPLICATION FILED APR. 24, 1908.
1,020,749. Patented Mar. 19, 1912.
INVENTOR
Isaac Montgomery Fisher
BY Paul A. Falk
His ATTORNEY
WITNESSES
L. Osborne
J. A. Kurzmann

ISAAC MONTGOMERY FISHER, OF SEATTLE, WASHINGTON.

ROPE OR STRAP FASTENING DEVICE.

1,020,749.   Specification of Letters Patent.   Patented Mar. 19, 1912.

Application filed April 24, 1906. Serial No. 313,518.

*To all whom it may concern:*

Be it known that I, ISAAC MONTGOMERY FISHER, a citizen of the United States, residing at Seattle, in the county of King and State of Washington, have invented new and useful Improvements in Rope or Strap Fastening Devices, of which the following is a specification.

My invention relates to improvements in rope and strap fasteners in which a wedge piece is used to secure the end of a rope to provide a detachable connection. The said wedge piece, when rope or cable is used, is grooved to conform to the shape of said cable and is adapted to jam the rope against the tapered inner surface of the fastener which also conforms to the shape of the cable, thus the wedge piece and fastener when used for straps or other flat surfaces is correspondingly flat.

The objects of my device is to construct a rope or strap fastening device that may be expeditiously attached to the end of any form of rope or strap and which will not damage the said rope, and which will not permit the rope to become loosened; to provide a means for preventing wear on the rope by the link or other construction; to hold the parts in an assembled position while being shipped. I attain these objects by the construction illustrated in the accompanying drawings in which—

Figure 1 is an elevation of a wedge piece showing the V form of groove in which the said groove is adapted to wedge upon the sides of the rope; Fig. 2 is an elevation of a wedge piece showing another form of groove adapted to conform to the surface of a rope; Fig. 3 is a section at 3 Fig. 2; Fig. 4 is a section of a retaining piece of my device; Fig. 5 is a plan view of the strap fastening of my device showing said strap in place; Fig. 6 is an elevation of my device; Fig. 7 is a section at 7 Fig. 6, showing the rope and wedge piece in place and the retaining piece and link in broken lines; Fig. 8 is a section at 8 Fig. 5 of the strap fastener showing the said strap in place.

Similar reference numerals refer to similar parts throughout the several views of my device as illustrated in the accompanying drawings.

When rope is used in the fastener piece 1, the inner surface of said fastener piece is preferably curved as at 2, the said curve being adapted to substantially conform to the general shape of the rope 3 which is held by a wedge piece 4 against curved surface of the said fastener 1 as at 2. To prevent said wedge piece 4 from being loosened I have provided a retaining piece 5 adapted to rest against said rope 3 at 5' and also against the end of a link 6 at 6'; the said link 6 is secured to my device by a pin 7 adapted to engage in apertures 8 and 8', which are provided in projections forming a part of said fastener 1. The pin 7 is preferably provided on one end with a head and on its other end with a cotter pin 9. I do not wish to be limited however, to a cotter pin as means for securing the said pin 7 as any of the numerous constructions now in use may be substituted. I have shown in Fig. 8 a form of fastener adapted to secure the end of a strap 3' which is secured between said wedge piece 4 and the inner tapered surface of said fastener 1. The outer surfaces of said wedge piece 4 and the inner surface of fastener 1 as at 2' are adapted to conform with the wider surface of the strap. The wedge piece 4 and the inner surface of the fastener 1 are preferably given less taper than the fastener for rope. The retaining piece 5 is adapted to rest against said strap at 5' and on the end of a link or other connecting means which is secured to my device.

Having thus described my invention what I claim as new and desire to secure by Letters Patent of the United States is—

1. In a rope or strap fastening device, a fastener piece extended to form apertured projections to receive a link and having a hollow center part converging from said projections, a loose wedge piece conforming to the general shape of the hollow center part and sufficiently small to permit the rope or strap to be wedged between said loose wedge piece and the surface of the hollow center part when a pulling strain is exerted on the rope or strap, a retaining piece engaging said hollow center part and fitting therein so as to be prevented from lateral movement by the walls thereof and prevented from longitudinal movement by the link secured to said rope or strap fastener.

2. In a rope or strap fastener, a fastener piece having tapered inner walls, a wedge piece adapted to hold a rope or strap against the inner walls when a strain is applied on said rope or strap, said fastener piece being provided with apertured extensions, a pin engaging said apertures, a link engaging said pin and a retainer piece engaging the inner walls of said fastener piece and removable only by the removal of said pin and said link.

In testimony whereof I have signed my name to this specification in the presence of two subscribing witnesses.

ISAAC MONTGOMERY FISHER.

Witnesses:
L. OSBORNE,
GRACE CALLIGAN.